United States Patent [19]
Jewell

[11] Patent Number: 6,113,019
[45] Date of Patent: Sep. 5, 2000

[54] DIRECT SPEED CHANGING GEAR DRIVE MECHANISM FOR A FISHING REEL

[75] Inventor: Charles E. Jewell, Green Lane, Pa.

[73] Assignee: Penn Fishing Tackle Manufacturing Co., Philadelphia, Pa.

[21] Appl. No.: 09/141,649

[22] Filed: Aug. 28, 1998

[51] Int. Cl.[7] ................................................ A01K 89/015
[52] U.S. Cl. ............................ 242/255; 74/333; 403/164
[58] Field of Search ............................... 242/255; 74/333; 403/164, 326, 327

[56] References Cited

U.S. PATENT DOCUMENTS

| | | | |
|---|---|---|---|
| 1,542,403 | 6/1925 | Miles | 242/255 |
| 1,773,996 | 8/1930 | Gordon | 74/333 |
| 2,150,088 | 3/1939 | White | 242/255 |
| 3,499,609 | 3/1970 | Policansky | 242/255 |
| 4,560,118 | 12/1985 | Weber et al. | |
| 4,723,727 | 2/1988 | Weber | 74/333 |
| 4,867,392 | 9/1989 | Sato | |
| 5,058,447 | 10/1991 | Ikuta | |
| 5,509,750 | 4/1996 | Boike | 403/164 |
| 5,667,332 | 9/1997 | Lindholm | 403/327 |
| 5,716,160 | 2/1998 | Lee | 403/327 |
| 5,852,948 | 12/1998 | Chang | 403/326 |

*Primary Examiner*—Katherine A. Matecki
*Attorney, Agent, or Firm*—Frank J. Benasutti

[57] ABSTRACT

A gear changing mechanism for a fishing reel has gears that directly and immediately come into contact with one another without an independent intermediate clutch member.

3 Claims, 5 Drawing Sheets

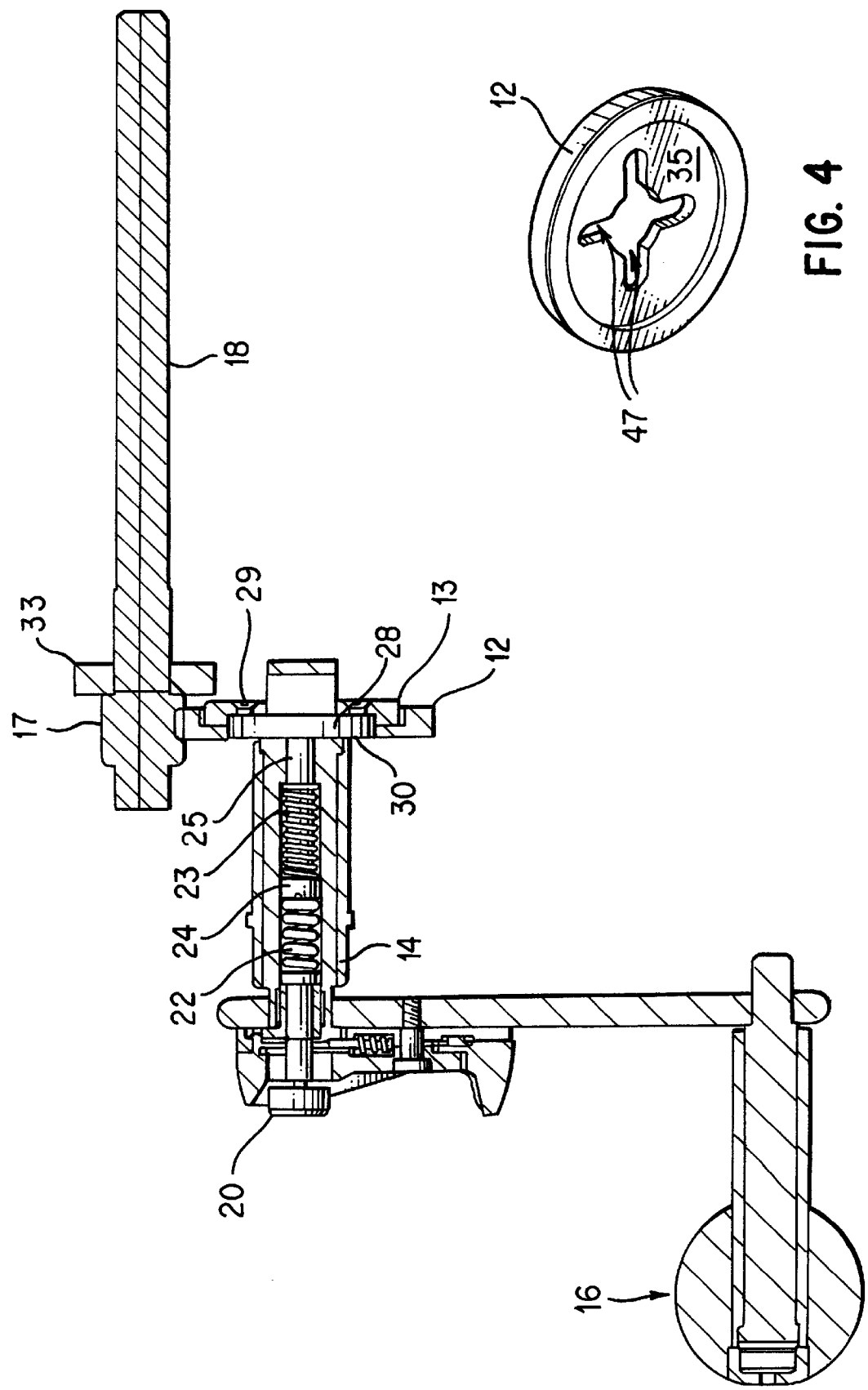

DIRECT SPEED CHANGING GEAR DRIVE MECHANISM FOR A FISHING REEL

BACKGROUND ART

This invention relates to a speed changing construction for a gear driven fishing reel and, more particularly, to a dual spring biased construction for use in direct engagement and disengagement of high and low speed gears in a fishing reel.

DESCRIPTION OF THE PRIOR ART

It is common in the prior to have a high and a low speed gear mounted for engagement with a drive shaft in a fishing reel. Various clutch mechanisms are known to engage one or the other of these gears and, in conjunction with those clutch mechanisms, it is common to use one or more springs. Often the springs are of different magnitudes of force. See, for example, U.S. Pat. No. 4,867,392, dated Sep. 19, 1989, issued to Jun Sato, for a speed changing device for a fishing reel. That device discloses a low speed gear 5, a high speed gear 7, a key 9 for engaging one of the other gears, a heavy spring 22, and a lighter spring 21. The arrangement is such as to provide a wait mechanism 20 that functions to make the operating member 10 operable even when the shifter 9 is actuated to contact the side surface of the gears 5 or 7, so that the engaging portions 9a do not engage with the engaging portion 5a or 7a. See FIG. 5 and Column 3, lines 29 through 39.

Multiple springs are also used to move a common engaging element, such as the element 10 in U.S. Pat. No. 5,058,447, dated Oct. 22, 1991, issued to Takeshi Ikuta, for a change-speed construction for a fishing reel. That element 10 is moved by springs 11a and 11b. It appears from the description of the prior art that the spring 11a' must be stronger than the spring 11b', since it states in Column 1, lines 49"51: "Also, for an operation to the opposite direction too, the element 10' reaches its engaging position through the urging force of the compression spring 11a'''".

In this device, power transmission is established through engagement of the engaging element 10 into engaging hole 6a of the first gear 6, or an engaging hole 7a of the second gear 7.

In accordance with this invention, the engaging element 10 first engages the face of the gear and then as the gear turns with respect to the engaging element 10, the element 10 slips into the slot. See the exploded perspective view FIG. 3.

This patent noted a deficiency in the prior art in that the member 10' could become tilted and discloses an improvement which maintains the positioning of that engaging member to prevent tilting.

SUMMARY OF INVENTION

It is the object of this invention to prevent hang-up or lock-up when changing gears.

It is further the object of this invention to provide a quick-acting gear-changing mechanism.

To those ends, I perceive it is desirable to have the gears conveniently and quickly directly engage one another without an intermediate independent clutch member and to do so in a manner that provides for easy engagement without having the gears lock up with one another. In accordance with my invention, I move the gears immediately into contact with one another without an independent intermediate member.

A first plunger is used to push on a heavier first spring and, thereafter, move a second plunger connected to a low speed gear. This second plunger also has a head which impinges upon a lighter second spring and collapses that spring as it moves the low speed gear out of engagement with a high speed gear. Upon release of the first plunger, the heavier first spring extends that first plunger in the opposite direction and the lighter second spring pushes the second plunger also in the opposite direction, so that the gears re-engage.

Thus, it will be observed that the springs commence the movement in this second direction and that the lighter spring forces the low speed gear into engagement with the high speed gear at a low frictional force. The low frictional force exerted between the two gears as they turn, thereby diminishes the likelihood of lock-up prior to full engagement.

In accordance with my invention I provide an improved direct gear changing means in a fishing reel having a main driven shaft and a drive shaft offset therefrom and at least two sets of gears mounted on said shafts to drive the main shaft in response to rotation of the drive shaft at high or low speeds, comprising:

a first gear of a first of said gear sets mounted on the drive shaft to rotate therewith;

a second gear of a second of said gear sets mounted to rotate freely on the drive shaft;

an engagement means fixedly directly connected to said first gear for selectively engaging said second gear to drive said second gear in response to rotation of said first gear; and a gear shift means to move said first gear selectively to or from a position driving said first gear set to drive said main driven shaft, to or from a position engaging said second gear to thereby drive said second gear set to drive said main driven shaft.

The engagement means comprises a key means fixedly directly attached to said first gear and said second gear has slots to receive said key means.

The gear shift means comprises means to disconnect the first gear from the second gear; and means to reconnect these gears comprising a plurality of springs. The springs are of different strengths comprising at least a heavy spring and a light spring; arranged such that the light spring exerts a force on the first gear to urge it into engagement with the second gear.

The key means and the second gear each have radial surfaces which are positioned therein in opposed relationship; and the gears on the drive shaft are portioned such that when the lighter spring exerts a force on the first gear to urge it toward the second gear and moves the first gear toward the second gear; and the key means may first engage the second gear on their respective radial surfaces, before the key means is received in the slots of the second gear.

The gear shift means further comprises a first plunger axially moveable between a first and second position;

a second plunger coaxially movable between a third and forth position with said first plunger;

a heavy spring coaxially mounted therebetween in engagement therewith;

a lighter spring coaxially mounted about said second plunger;

said first plunger being fixedly connected to said first gear;

said springs being retained in said drive shaft and positioned to urge said plungers in one direction wherein said first plunger will be in said first position and said second plunger will be in said third position and said first and second gears will be in engagement with one another.

The springs and plungers are arranged and positioned with respect to one another such that when the first plunger is moved from the first position toward the second position it compresses the heavier spring against the second plunger and compresses the lighter spring and moves the second plunger from the third position toward the forth position to thereby move the gears out of engagement with one another.

BRIEF DESCRIPTION OF THE DRAWINGS

FIG. 3 is a view of a portion of the device shown in FIG. 2, with parts in a different position;

FIG. 4 is a perspective view of a part of the mechanism;

DESCRIPTION OF THE PREFERRED EMBODIMENTS

Figure 1:
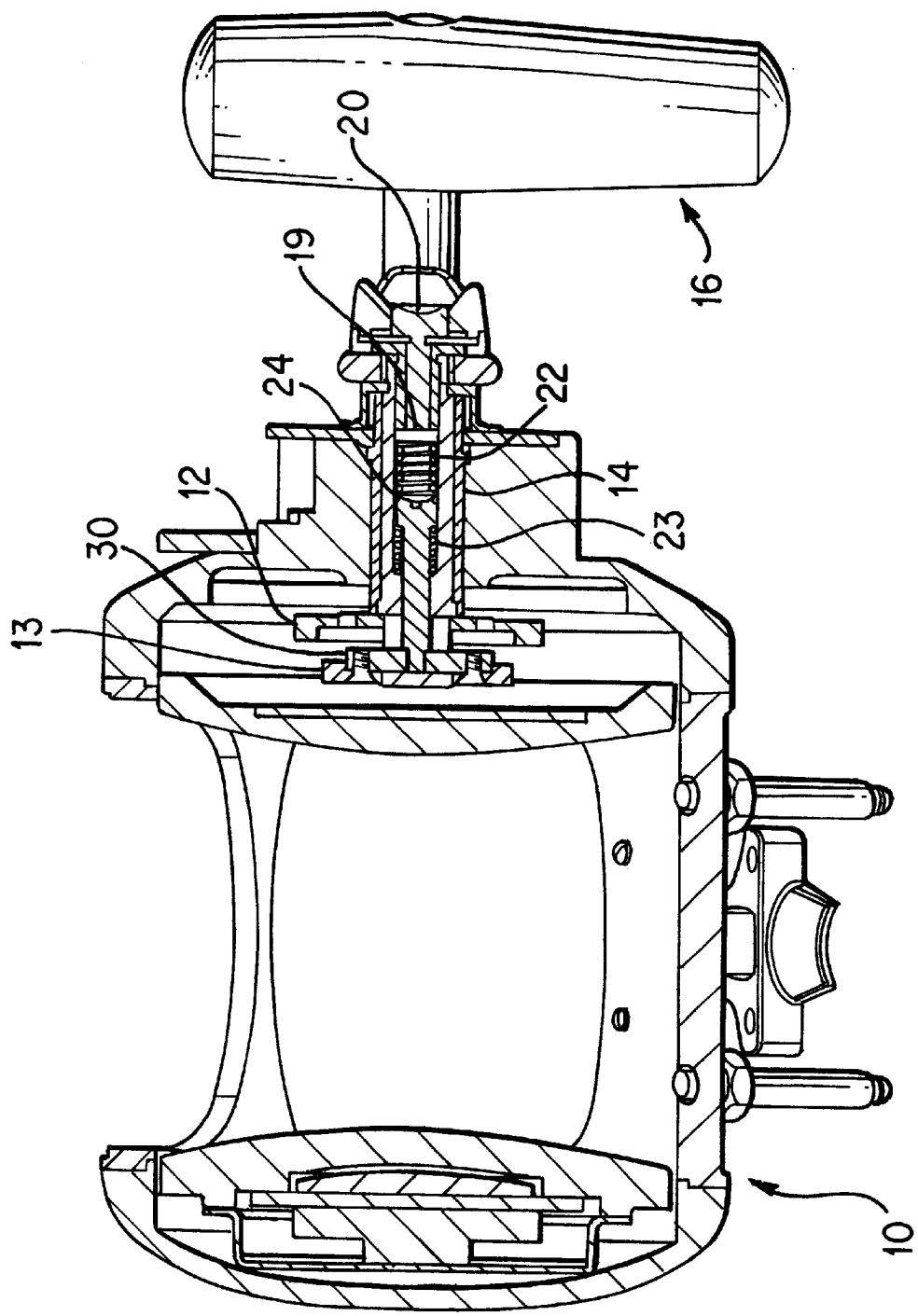
FIG. 1 is a cross-sectional elevation of a fishing reel incorporating the drive mechanism in accordance with my invention.

Referring to the figures, FIG. 1 shows a high speed gear 12 and low speed gear 13 mounted on or about a drive shaft 14 which rotates in response to rotation of the crank handle means designated generally 16; all of which are part of a fishing reel designated generally 10. In the position shown in FIG. 2, the high speed gear 12 is in engagement with the high speed pinion or driven gear 17 on the main drive shaft 18 of the reel. The low speed gear 13 is in engagement with the low speed pinion or driven gear 33 on the main drive shaft 18. Rotating the handle mechanism 16 will drive the main shaft 18 through the low speed gear set 13–33; while the high speed gear 12 will simply rotate freely in response to the rotation of the main driven shaft 18 and the high speed driven pinion gear 17. The parts not specifically described herein as shown are well known in the art as, for example, the art identified hereinabove and will not be described in further detail.

The high speed gear is retained by a gear retainer means. The retaining ring 70 sits in a groove 72 in the drive shaft. The inner diameter of the groove is less than the inner diameter of the retaining ring. The bore of the gear has a 60° chamfer 71 and a groove immediately afterwards. The outer diameter of the groove is the same or a bit less than the outer diameter of the retaining ring.

During the assembly, the retaining ring is expanded onto the drive shaft and slid into the groove. It will not come out of the groove unless pried out. The gear is then placed on the shaft. The 60° chamfer acts as a ramp and compresses the retaining ring in the groove. This continues until the outer diameter of the retaining ring is the same as the outer diameter of the drive shaft. The retaining ring expands into the groove in the gear bore, thus retaining it. It takes a much greater deal of force to remove the gear than assembly, but it can be removed without tools. This arrangement also allows the gear to rotate with respect to the drive shaft. This is necessary in this drive train/shift mechanism due to the fact that when the low speed gear is engaged, both gears are meshed and will not be rotating at the same RPM.

A first plunger 19 is provided to be forced axially to the right by the exercise of thumb pressure on its head, the shift button 20. The plunger is driven against a heavy first spring 22 which, in turn, impinges upon the head 24 of a second plunger 25. The end 27 of the second plunger 25 remote from the head engaging the heavier first spring 22, is fixedly connected to the low speed gear 13 at a key portion 28 which is screwed (by means of the screws 29) directly to the low speed gear 13 to rotate therewith. Upon being impinged upon by movement of the two plungers to the right when viewed as in FIG. 2, the plungers move to that position shown in FIG. 2. The plungers may be locked in that position by means of a manually operable laterally retractable lock means designated 31 (well known in the art) which fits into a groove below the head 20 of the first plunger 19 as is well known in the art.

Figure 2:
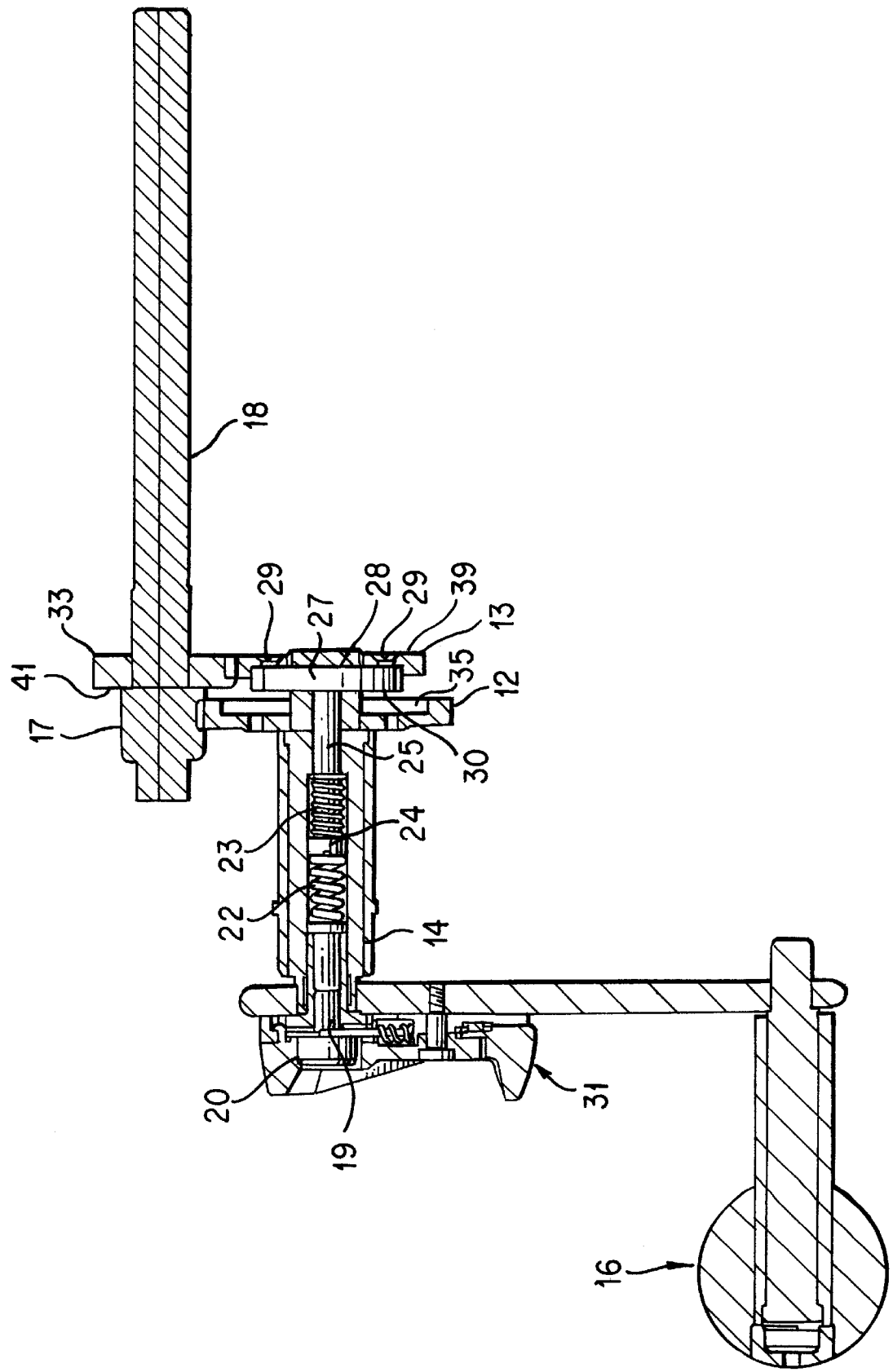
FIG. 2 is an enlarged, sectional view showing of a portion of the device shown in FIG. 1 and additional elements of the mechanism.

If the teeth of the low speed gear are not lined up with the teeth of the low speed pinion, the radially extending face 39 of the low speed gear 13 will engage the radially extending face 41 of the pinion 33 until these gears rotate sufficiently with respect to one another, that their respective teeth line up. At that point, the low speed gear will continue to move to the right until its teeth mesh with the teeth of the low speed pinion as shown in FIG. 2.

Upon retraction of the laterally retractable lock means designated generally 31, the heavy spring 22 expands and moves the first plunger 19 to the left. The lighter second spring 23 pushes on the under side of the head 24 of the plunger 25 and forces it to the left. This moves the low speed gear 13 into engagement with the high speed gear 12 as shown in FIG. 3. Typically the heavy spring may be stainless steel 0.560" in length and 0.250" in outside diameter and having a wire diameter of 0.035" to provide 37 pounds per square inch of pressure. The lighter spring may be stainless steel 0.750" long and 0.266" in outside diameter and having a wire diameter of 0.030" to provide 9.8 pounds per square inch of pressure.

Figure 5:
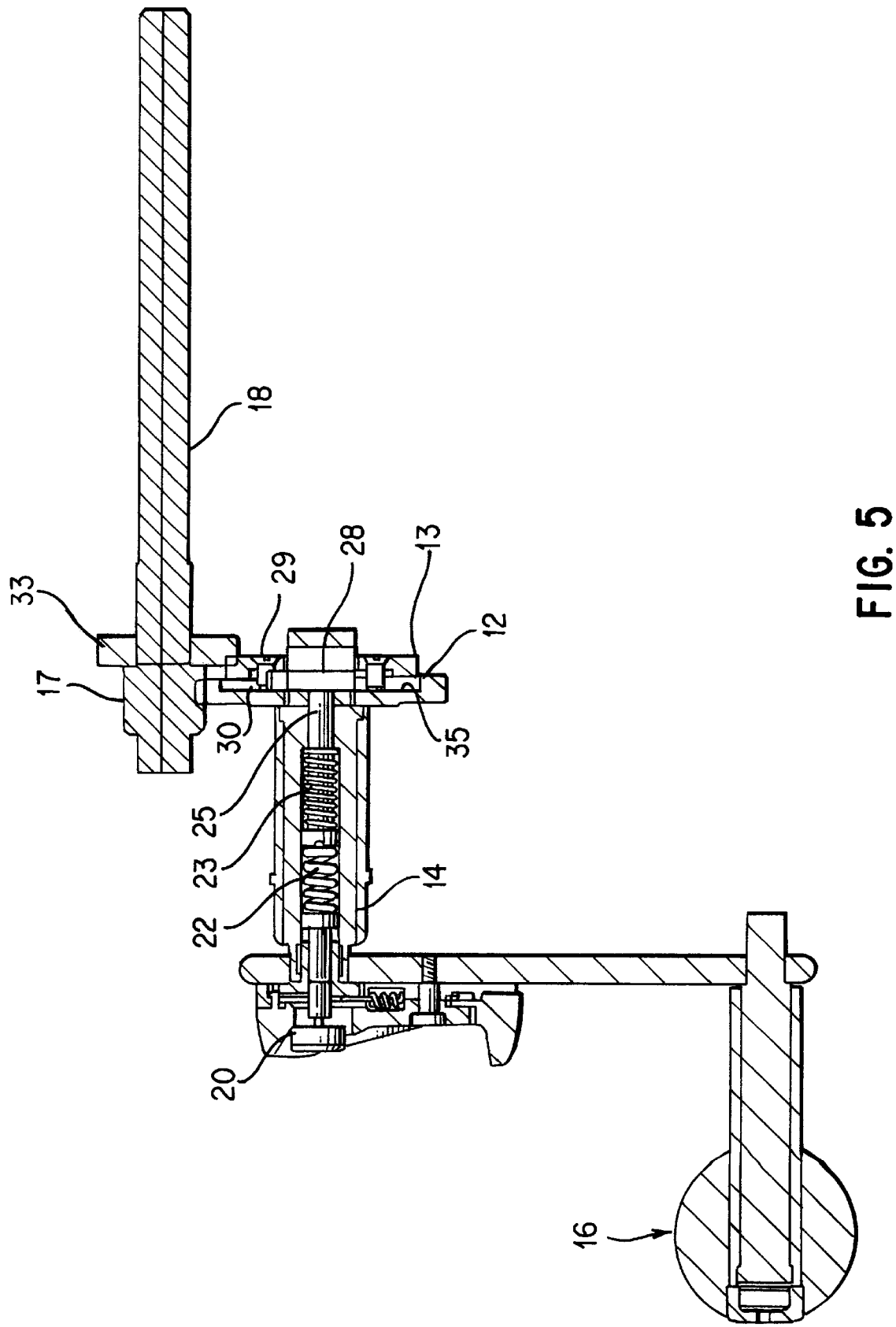
FIG. 5 is a view of a portion of the device shown in FIG. 2, with parts in a different position.
Figure 6:
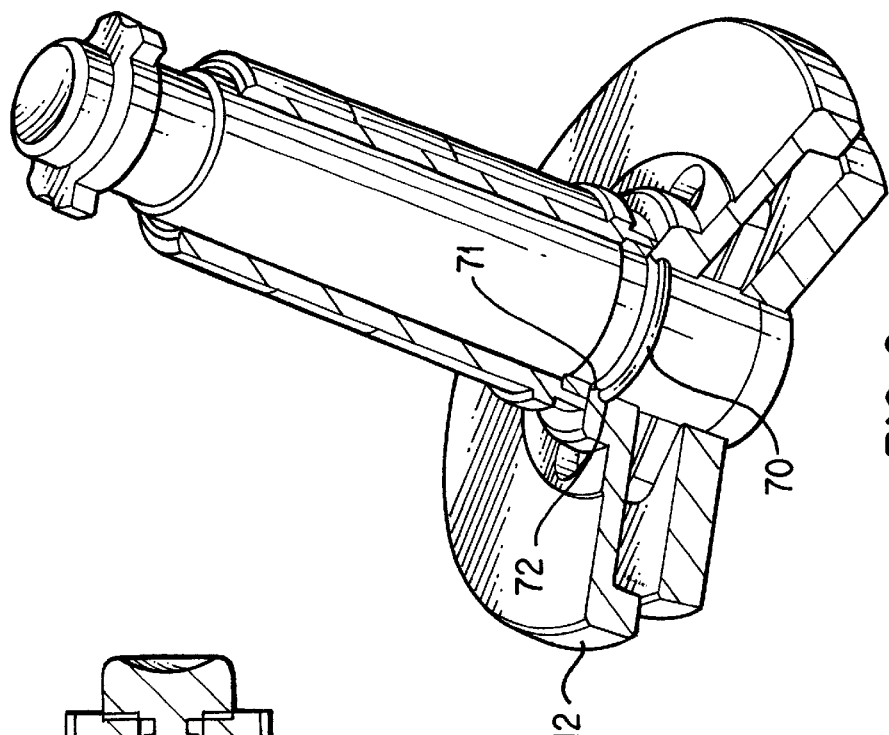
FIG. 6 is a perspective view partly in section of a portion of the apparatus.
Figure 7:
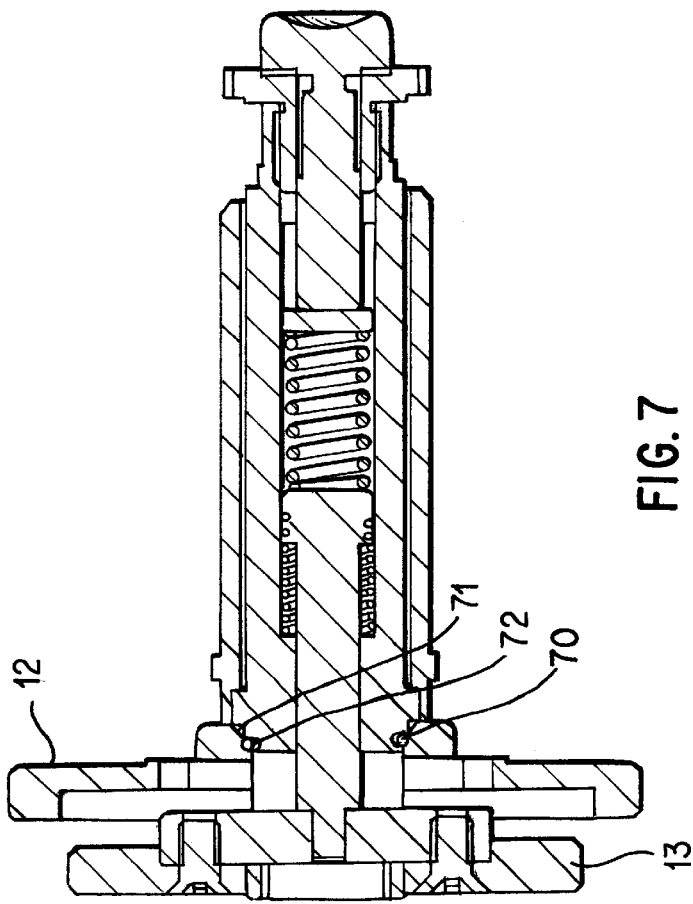
FIG. 7 is a cross-section of the portion shown in FIG. 6.

In operation, this engagement would first consist of the radially extending face 30 of the key portion 28 of the low speed gear assembly engaging the radially extending face 35 (see FIGS. 2 & 5) of the relieved portion of the high speed gear 12 (see FIGS. 4 and 5). As the high and low speed gears continue to rotate, the parts eventually would come into position so that the key portion 28 of the low speed gear assembly can fully engage and move even further to the left. This initial engagement between the faces 30,35 permits the parts to mesh as they turn in frictional engagement with one another. In other words, they initially engage along flat radially extending surfaces and as they turn with respect to one another they find that they can fully engage; as the low speed gear 13 moves further to the left (from the position shown in FIG. 5 to the position shown in FIG. 3).

The high speed gear 12 is shown in FIG. 4. A plurality of diametrically opposed slots designated generally 47 are provided therein to receive the key portion 28 and mate therewith to drive the high speed gear.

What is claimed is:

1. In a fishing reel having a main driven shaft and a drive shaft offset therefrom and at least two sets of gears mounted on said shafts to drive the main shaft in response to rotation of the drive shaft at high or low speeds, an improved direct gear changing means comprising:

a first gear of a first of said gear sets mounted on the drive shaft to rotate therewith;

a second gear of a second of said gear sets mounted to rotate freely on the drive shaft;

an engagement means fixedly directly connected to said first gear for selectively engaging said second gear to drive said second gear in response to rotation of said first gear; said engagement means comprising a key means fixedly directly attached to said first gear and said second gear having slots to receive said key means; and the key means and the second gear each having radial surfaces which are positioned therein in opposed relationship; and the gears on the drive shaft are positioned such that when the first gear moves toward the second gear, the key means first engages the second gear on their respective radial surfaces, before the key means is received in the slots of the second gear; and a gear shift means to move said first gear selectively between a position driving said first gear set to drive said main driven shaft, and a position engaging said second gear to thereby drive said second gear set to drive said main driven shaft; said gear shift means comprising a plurality of springs; and said springs being of different strengths comprising at least a heavy spring and a light spring; arranged such that the light spring exerts a force on the first gear to urge it into engagement with the second gear; and wherein the gear shift means further comprises a first plunger axially movable between a first and second position; a second plunger coaxially movable between a third and fourth position with said first plunger; the heavy spring coaxially mounted therebetween in engagement therewith; the lighter spring coaxially mounted about said second plunger; said first plunger being fixedly connected to said first gear; said springs being retained in said drive shaft and positioned to urge said plungers in one direction wherein said first plunger will be in said first position and said second plunger will be in said third position and said first and second gears will be in engagement with one another.

2. The gear changing means of claim 1 wherein the springs and plungers are arranged and positioned with respect to one another such that when the first plunger is moved from the first position toward the second position it compresses the heavier spring against the second plunger and compresses the lighter spring and moves the second plunger from the third position toward the forth position to thereby move the gears out of engagement with one another.

3. The gear changing means of claim 2 wherein the light spring exerts a pressure of less than ten pounds per square inch.

* * * * *